(12) United States Patent
Johnson

(10) Patent No.: US 10,149,537 B2
(45) Date of Patent: Dec. 11, 2018

(54) FISHING ROD ORGANIZER AND CARRIER

(71) Applicant: Scott Johnson, Germfask, MI (US)

(72) Inventor: Scott Johnson, Germfask, MI (US)

( * ) Notice: Subject to any disclaimer, the term of this patent is extended or adjusted under 35 U.S.C. 154(b) by 0 days.

(21) Appl. No.: 15/711,418

(22) Filed: Sep. 21, 2017

(65) Prior Publication Data

US 2018/0084909 A1   Mar. 29, 2018

Related U.S. Application Data

(60) Provisional application No. 62/399,581, filed on Sep. 26, 2016.

(51) Int. Cl.
  *A47F 7/00* (2006.01)
  *A47B 81/00* (2006.01)
  *A01K 97/08* (2006.01)

(52) U.S. Cl.
  CPC ........... *A47B 81/005* (2013.01); *A01K 97/08* (2013.01); *A47F 7/0028* (2013.01)

(58) Field of Classification Search
  CPC ...... A47B 81/005; A01K 97/08; A01K 97/10; A01K 97/00; A47F 7/0028; A47F 7/0021; A47F 7/0035; B60R 9/08
  USPC ................ 211/70.8, 60.1, 59.4, 74, 175; 206/315.11; 224/922; 43/21.1, 18.1 R, 43/54.1
  See application file for complete search history.

(56) References Cited

U.S. PATENT DOCUMENTS

| | | | | |
|---|---|---|---|---|
| 2,555,073 | A * | 5/1951 | Zdankoski | A01K 97/22 211/70.8 |
| 3,399,009 | A * | 8/1968 | Slade | A01K 97/08 206/315.11 |
| 4,196,538 | A * | 4/1980 | Crone | A01K 97/00 206/315.11 |
| 4,311,262 | A * | 1/1982 | Morin | A01K 97/10 206/443 |
| 4,523,704 | A * | 6/1985 | Washington | B60R 9/055 224/328 |
| 4,641,755 | A * | 2/1987 | Oliver | F42B 39/28 206/3 |
| 4,927,016 | A * | 5/1990 | Fuller | A01K 97/06 206/315.11 |
| 4,953,318 | A * | 9/1990 | Vasseur, Jr. | A01K 97/10 211/195 |

(Continued)

Primary Examiner — Jennifer E. Novosad
(74) Attorney, Agent, or Firm — Price Heneveld LLP

(57) ABSTRACT

A fishing rod holder includes a retainer box having front, rear, upper and lower portions defined by a frame comprised of a plurality of upright frame members, wherein the plurality of upright frame members includes front upright frame members and rear upright frame members. The rear upright frame members include support portions for abuttingly supporting the retainer box in a raised position above a support surface. A planar member on the lower portion of the retainer box and includes a plurality of receiving apertures configured to receive a first portion of a fishing rod therethrough. First and second brackets are disposed on opposite sides of the retainer box having inwardly opening channels disposed therealong. Multiple divider members are slidingly received in the channels of the first and second brackets for movement therealong, wherein adjacent divider members are configured to retain a second portion of the fishing rod therebetween.

16 Claims, 7 Drawing Sheets

(56) References Cited

U.S. PATENT DOCUMENTS

| | | | | |
|---|---|---|---|---|
| 5,094,351 A * | 3/1992 | Barney | A47B 81/005 | 211/117 |
| 5,095,645 A * | 3/1992 | Borawski | A01K 97/06 | 206/315.11 |
| 5,123,547 A * | 6/1992 | Koch | F16L 3/2235 | 211/59.4 |
| 5,139,221 A * | 8/1992 | Lodrick | A47F 7/0028 | 211/68 |
| 5,289,940 A * | 3/1994 | Wisenbaugh | A01K 97/06 | 206/315.1 |
| 5,366,071 A * | 11/1994 | Laszlo | A01K 97/26 | 206/218 |
| 5,371,968 A * | 12/1994 | Casey | A01K 87/00 | 206/315.11 |
| 5,386,662 A * | 2/1995 | Vader | A01K 97/06 | 206/315.11 |
| 5,414,953 A * | 5/1995 | Taylor | A01K 97/10 | 43/21.2 |
| 5,582,290 A * | 12/1996 | McCuaig | A63B 55/40 | 206/315.6 |
| 5,586,404 A * | 12/1996 | Freitas | A01K 97/08 | 43/21.2 |
| 5,588,542 A | 12/1996 | Winkler, Jr. et al. | | |
| 5,593,061 A * | 1/1997 | Prochnow | A01K 97/06 | 206/315.11 |
| 5,606,820 A * | 3/1997 | Suddeth | A01K 97/06 | 206/315.11 |
| 5,657,883 A | 8/1997 | Badia | | |
| 5,678,348 A | 10/1997 | Zielinski et al. | | |
| 5,803,519 A * | 9/1998 | Daigle | A01K 97/08 | 211/70.8 |
| 5,881,874 A * | 3/1999 | McKinney | F41C 33/06 | 206/315.11 |
| 5,957,321 A * | 9/1999 | Jones | A01K 97/26 | 206/315.11 |
| 5,992,802 A * | 11/1999 | Campbell | H02G 3/30 | 248/68.1 |
| 6,047,491 A * | 4/2000 | De Busk | A01K 97/08 | 206/315.11 |
| 6,053,456 A * | 4/2000 | Dispenza | F16L 5/10 | 248/56 |
| 6,182,837 B1 * | 2/2001 | Crabtree | B65D 81/05 | 206/443 |
| 6,250,480 B1 | 6/2001 | McGuinness | | |
| 6,360,902 B1 | 3/2002 | Searles | | |
| 6,378,699 B1 * | 4/2002 | Churchill | A01K 97/01 | 206/315.11 |
| 6,401,381 B1 * | 6/2002 | Broberg | A01K 97/08 | 248/512 |
| 6,487,814 B1 * | 12/2002 | Arredondo | A01K 97/06 | 206/315.11 |
| 6,592,309 B1 * | 7/2003 | Baughey | B60P 7/12 | 211/59.4 |
| 6,883,268 B2 * | 4/2005 | Fraser | A01K 97/22 | 206/315.11 |
| 6,931,782 B1 * | 8/2005 | Pitcock | A01K 97/08 | 224/922 |
| 7,322,149 B1 * | 1/2008 | Quintero | A01K 97/08 | 206/315.11 |
| 7,681,768 B2 * | 3/2010 | Gates | B60R 11/00 | 224/401 |
| 7,922,012 B2 * | 4/2011 | Sisley | H02G 3/0456 | 211/26 |
| 8,544,653 B2 * | 10/2013 | Kao | B25H 3/04 | 206/485 |
| 8,943,739 B2 | 2/2015 | Blake, III | | |
| 9,004,274 B2 * | 4/2015 | Thornberg | A01K 97/08 | 206/315.6 |
| 9,137,981 B1 * | 9/2015 | Groves, Jr. | A47B 81/005 | |
| 9,586,080 B2 * | 3/2017 | Pederson | A63B 21/078 | |
| 2005/0194872 A1 * | 9/2005 | Cleveland | A47B 81/005 | 312/290 |
| 2007/0045973 A1 * | 3/2007 | Grosso | A01K 97/08 | 280/47.26 |
| 2008/0110948 A1 * | 5/2008 | Sutter | A01K 97/08 | 224/282 |
| 2009/0071058 A1 * | 3/2009 | Chavez | A01K 97/06 | 43/54.1 |
| 2010/0307939 A1 * | 12/2010 | Schmitt | A01K 97/06 | 206/315.11 |
| 2011/0204109 A1 * | 8/2011 | Knutson | A01K 97/08 | 224/405 |
| 2012/0047791 A1 * | 3/2012 | Blake | A01K 97/06 | 43/54.1 |
| 2015/0359210 A1 | 12/2015 | Rossi et al. | | |
| 2018/0084909 A1 * | 3/2018 | Johnson | A47B 81/005 | |

* cited by examiner

US 10,149,537 B2

FISHING ROD ORGANIZER AND CARRIER

CROSS-REFERENCE TO RELATED APPLICATION

This application claims priority to and the benefit under 35 U.S.C. § 119(e) of U.S. Provisional Patent Application No. 62/399,581 filed on Sep. 26, 2016, entitled, FISHING ROD ORGANIZER AND CARRIER, the entire disclosure of which is hereby incorporated herein by reference.

FIELD OF THE INVENTION

The present invention generally relates to a fishing rod holder, and more particularly, to a fishing rod holder configured to store and carry multiple fishing rods in retained positions in either a vertical or horizontal manner.

BACKGROUND OF THE INVENTION

For different types of fishing, having multiple fishing rods setup with various types of rigs provides a convenient way for a fisherman to quickly switch gear during a fishing excursion. The multiple fishing rods can be setup with different gear that is particularly configured for specific target fish or specific fishing environments. When using multiple fishing rods, it is important that unused fishing rods are properly stored and do not become tangled or damaged while stored or in transit. Further, it is important to provide a convenient means of transporting and storing the fishing rods during an actual fishing excursion.

SUMMARY OF THE INVENTION

One aspect of the present invention includes a fishing rod holder with a retainer box having front and rear portions, wherein the front and rear portions each include one or more upright frame members. The upright frame members of the rear portion include support portions for abuttingly supporting the retainer box in a raised position on a support surface. A planar member is disposed on the lower portion of the retainer box and includes a plurality of receiving apertures disposed therethrough. Each receiving aperture is configured to receive a portion of a fishing rod therethrough. First and second bracket members interconnect the upright frame members of the front and rear portions the retainer box. The first and second bracket members include respective first and second channels disposed therealong. A plurality of divider members are slidingly received in the first and second channels of the first and second bracket members for movement along a length thereof, wherein adjacent divider members are configured to retain a portion of a fishing rod therebetween.

Another aspect of the present invention includes a fishing rod holder configured to be supported on a support surface and hold a number of fishing rods, wherein each fishing rod includes a shaft portion having a distal tip and a distal end, a reel assembly, and a handle portion. The fishing rod holder includes first and second bracket members spaced-apart from one another to define a receiving area therebetween. The first and second bracket members include respective first and second channels inwardly opening into the receiving area. First and second frame members are coupled to the first and second bracket members and each include a first portion and a second portion. The second portion extends outwardly from the first portion. The fishing rod holder is supported on the support surface at the first portions of the first and second frame members in a first configuration, and is supported on the support surface at the second portions of the first and second frame members in a second configuration. A plurality of divider are slideably and removeably received in the first and second channels of the first and second bracket members, respectively.

Yet, another aspect of the present invention includes a fishing rod holder configured to be supported on a support surface and hold a number of fishing rods. The fishing rod holder includes first and second bracket members spaced-apart from one another to define a receiving area therebetween. The first and second bracket members include respective first and second channels inwardly opening into the receiving area. An abutment plate includes a plurality of receiving apertures disposed therethrough. First and second frame members are coupled to the first and second bracket members, respectively, and the abutment plate. The abutment plate is spaced-apart from the first and second bracket members in assembly. A plurality of divider members include body portions with opposing first and second ends and front and rear edges. The first and second ends of each divider member are slideably and removeably received in the first and second channels of the first and second bracket members. Adjacent divider members define rows for retaining the fishing rods therein.

These and other features, advantages, and objects of the present invention will be further understood and appreciated by those skilled in the art by reference to the following specification, claims, and appended drawings.

DETAILED DESCRIPTION

Figure 1:
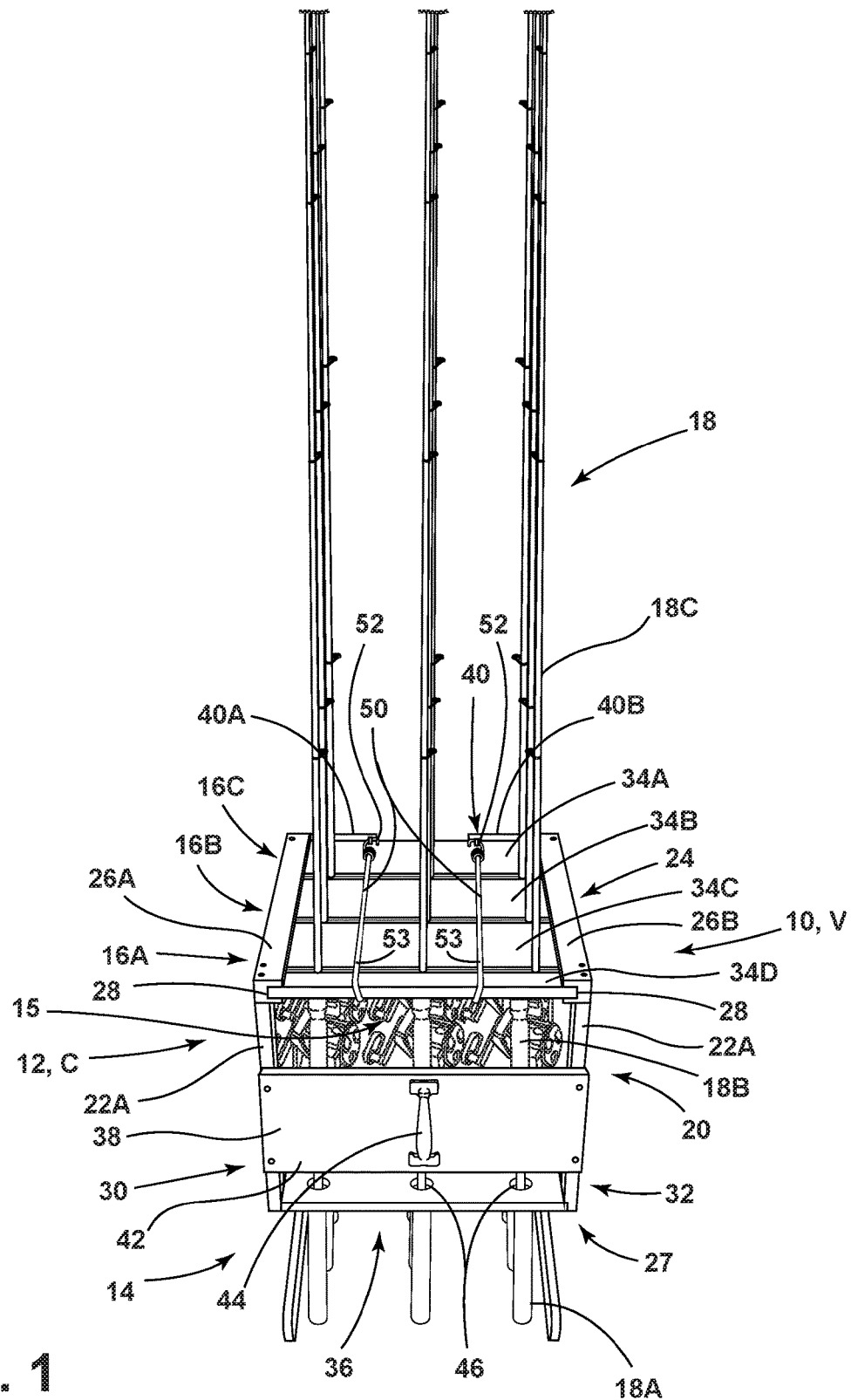
FIG. 1 is a top perspective view of a fishing rod holder in a vertical orientation according to an embodiment of the present invention.
Figure 3:
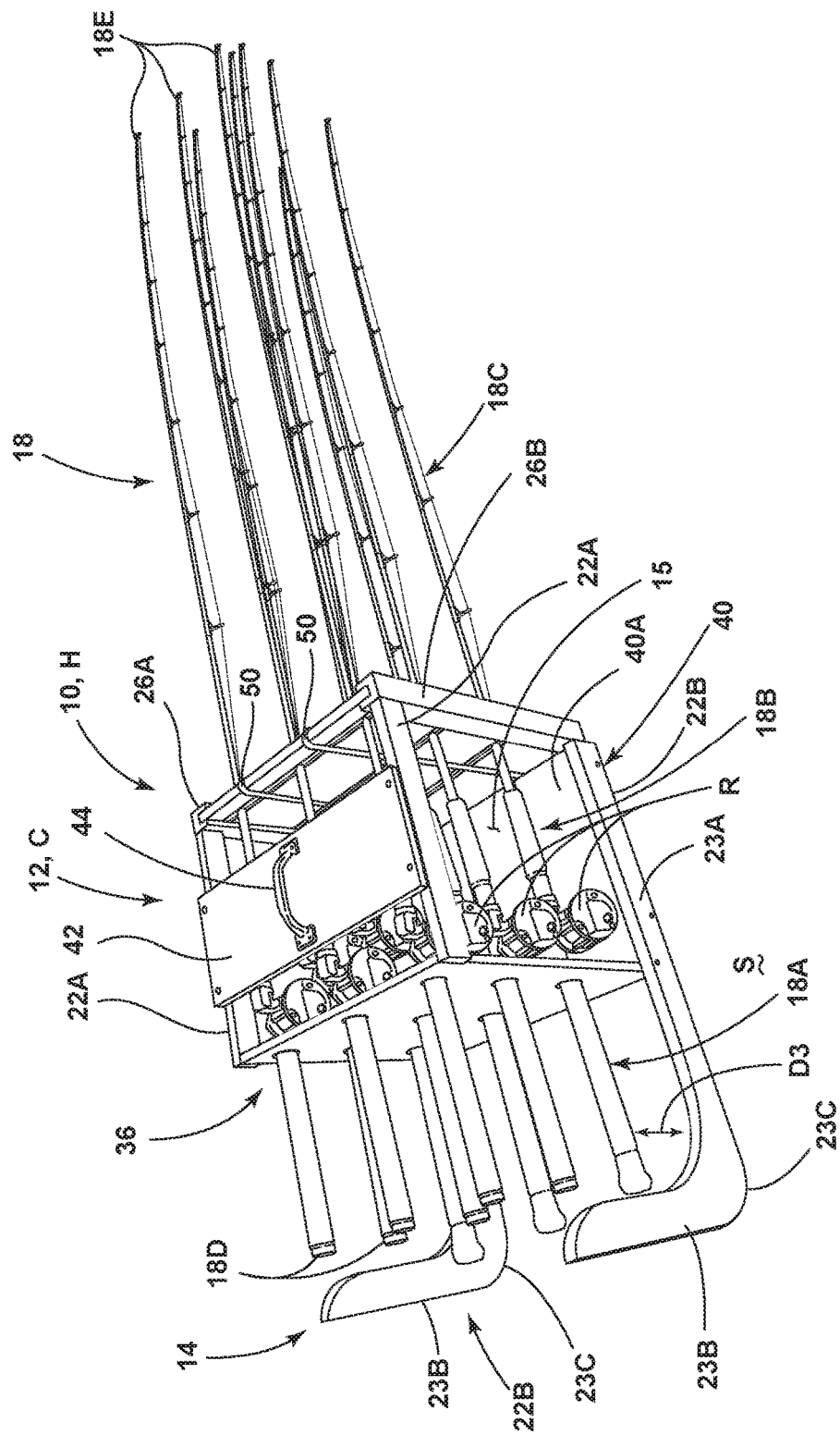
FIG. 3 is a top perspective view of the fishing rod holder of FIG. 1 in a horizontal configuration.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. Thus, directional terms used to describe features of the present invention in a vertical position in FIG. 1 will also be used to describe the same features of the present invention in a horizontal position as shown in FIG. 3. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a fishing rod holder according to one embodiment of the present invention. The fishing rod holder 10 includes a retainer box 12 and is shown supported in a vertical condition V by a base portion 14. The retainer box 12 is shown in FIG. 1 in a closed condition C supporting multiple rows 16A-16C of fishing rods 18 in a receiving area 15. The retainer box 12 includes a frame assembly 20 having a plurality of upright members 22 which interconnect upper and lower portions 24, 27 of the retainer box 12. In FIG. 1, the upper portion 24 is shown having first and second bracket members 26A, 26B which are interconnected by front and rear upright members 22A, 22B disposed on opposite sides 30, 32 of the retainer box 12, as further described below. The first and second bracket members 26A, 26B each include inwardly opening channels 28 which are configured to slidingly receive divider members 34A-34D within the receiving area 15. Sliding movement of the divider members 34A-34D along the channels 28 of the first and second bracket members 26A, 26B is further described below. The frame assembly 20 of the retainer box 12 further includes a front portion 38 and a rear portion 40. The front portion 38 includes a stringer 42 coupled between the front upright frame members 22A having a handle 44 disposed thereon. The lower portion 27 of the frame 20 includes a planar member 36 having a plurality of receiving apertures 46 disposed therethrough for receiving handle portions 18A of the fishing rods 18. The planar member 36 defines an abutment plate for the fishing rods 18, as further described below. It is contemplated that all of the structural components of the fishing rod holder 10 disclosed herein may be comprised of a metal, wood, composite, polymeric, or other rigid material and are not intended to be limited to any particular material.

Each fishing rod 18 shown in FIG. 1 includes a handle portion 18A, a reel portion 18B, a shaft portion 18C, a distal end 18D (FIG. 2) and a distal tip 18E (FIG. 3). The reel portion 18B includes reels R (FIG. 2) that are mounted to the fishing rods 18 and are contained within the frame 20 of the retainer box 12 at the receiving area 15. In this way, the reels R are less susceptible to damage during transit due to their containment within the receiving area 15 of the retainer box 12. Segments of the shaft portions 18C of the rods 18 are configured to be secured between adjacent divider members 34A-34D within the receiving area 15. In the embodiment shown in FIG. 1, three rows 16A-16C of fishing rods 18 are shown having three fishing rods 18 disposed in each row 16A-16C. However, it is contemplated that more or less divider members can be used in the formation of the upper portion 24 of the retainer box 12 to safely secure and retain more or less fishing rods within the fishing rod holder 10.

As further shown in FIG. 1, first and second retaining straps 50 are used to retain the retainer box 12 in the closed condition C. The retaining straps 50 are configured to be secured to the first divider member 34A at upper and lower surfaces thereof at first and second ends 52, 54 (end 54 is not identified, but contemplated to be a hook end like end 52). Further, the retaining straps 50 include body portions 53 disposed between the first and second ends 52, 54, which may be elastic portions which extend around the remaining divider members 34B-34D wrap to retain the divider members 34B-34D in a contained and engaged relationship with the shaft portions 18C of the fishing rods 18 and the channels 28 of the first and second bracket members 26A, 26B. It is further contemplated that the retaining straps 50 can be attached to other locations on the retainer box 12 and frame 20 to properly secure the divider members 34A-34D for holding the fishing rods 18 in such a manner that the fishing rods 18 do not move once secured in the receiving area 15 of the retainer box 12.

Figure 2:
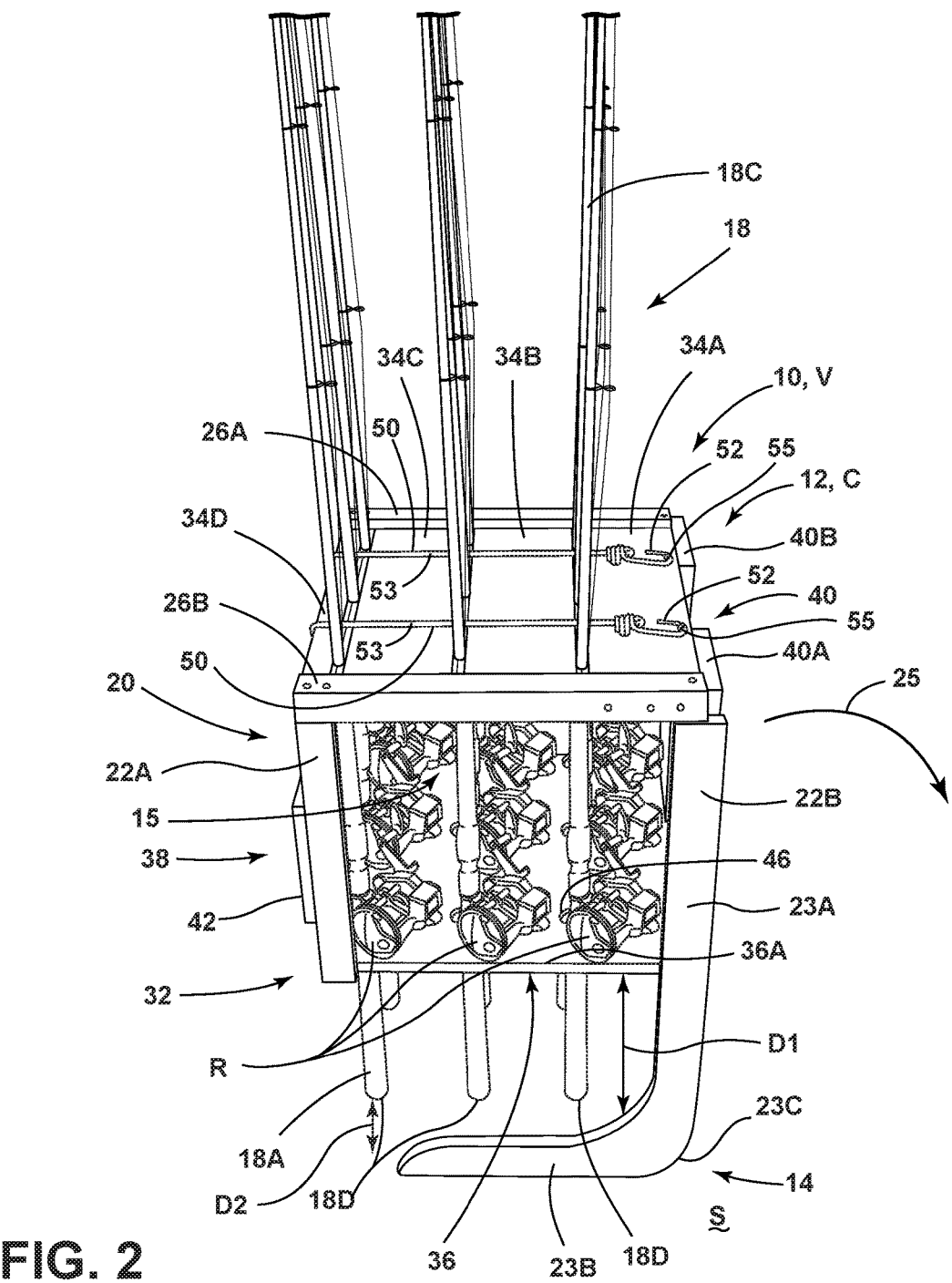
FIG. 2 is a top side perspective view of the fishing rod holder of FIG. 1.

Referring now to FIG. 2, the fishing rod holder 10 is again shown in a vertical configuration V with the retainer box 12 in a closed condition C to retain nine fishing rods 18 therein. The frame 20 of the retainer box 12 is shown having front upright members 22A and rear upright members 22B. The rear upright members 22B include upright portions 23A and outwardly extending support portions 23B that extend below the retainer box 12 approximately 90° from the upright portions 23A. When the fishing rod holder 10 is in the vertical configuration V, the fishing rod holder 10 is supported by the outwardly extending support portions 23B of the rear upright members 22B. The upright portion 23A of the rear upright member 22B is configured to provide a distance D1 between the planar member 36 and a support surface S on which the outwardly extending support portions 23B are supported. In this way, the distal ends 18D of the handle portions 18A of the fishing rods 18 do not contact the support surface S when the fishing rod holder 10 is in the vertical configuration V. Thus, the distal ends 18D of the fishing rods 18 are suspended above the support surface S on which the fishing rod holder 10 is supported a distance D2 when the fishing rod holder 10 is in the vertical configuration V. In this way, the distal ends 18D of the fishing rods 18 are not damaged during movement and storage of the fishing rods 18 using the fishing rod holder 10, because the retainer box 12 is supported in a raised configuration over the support surface S. Further, the reels R of the fishing rods 18 abut an upper surface 36A of the planar member 36, such that the fishing rods 18 do not move further downward through the receiving apertures 46 disposed through the planar member 36 when the fishing rod holder 10 is in the vertical configuration V. Thus, the receiving apertures 46 disposed through the planar member 36 are configured to retain a first portion (the handle portion 18A) of the fishing rods 18, without letting the distal ends 18D of the fishing rods 18 contact the support surface S.

Referring now to FIG. 3, the fishing rod holder 10 is shown in a horizontal configuration H, wherein the fishing rod holder 10 is supported on the support surface S by the abutment of the upright portions 23A of the rear upright members 22B. In FIG. 3, the rear upright members 22B are shown having rounded joint portions 23C disposed between the upright portion 23A and the outwardly extending support portion 23B. In this way, the fishing rod holder 10 can be rotated or rolled from the vertical configuration V (FIG. 2) towards the horizontal configuration H (FIG. 3) along the rounded joint portions 23C of the rear upright members 22B along the path as indicated by arrow 25 (FIG. 2). In the horizontal configuration H, the fishing rod holder 10 provides for a sturdy engagement of the fishing rod holder 10 with the support surface S for transporting the fishing rods 18 between locations in either a vehicle or on a boat. When floor space is limited, the fishing rod holder 10 can be rotated to the upright vertical configuration V (FIG. 2) for more prolonged storage. When the fishing rod holder 10 is in the horizontal configuration H, the fishing rod holder 10 can be carried using the handle 44 disposed on the stringer 42 located on the front portion 38 of the retainer box 12. As further shown in FIG. 3, the handle portions 18A of the fishing rods 18 are supported above the support surface S a distance D3 (at least). The distal tips 18E of the fishing rods 18 are also spaced apart from the support surface S.

Figure 4:
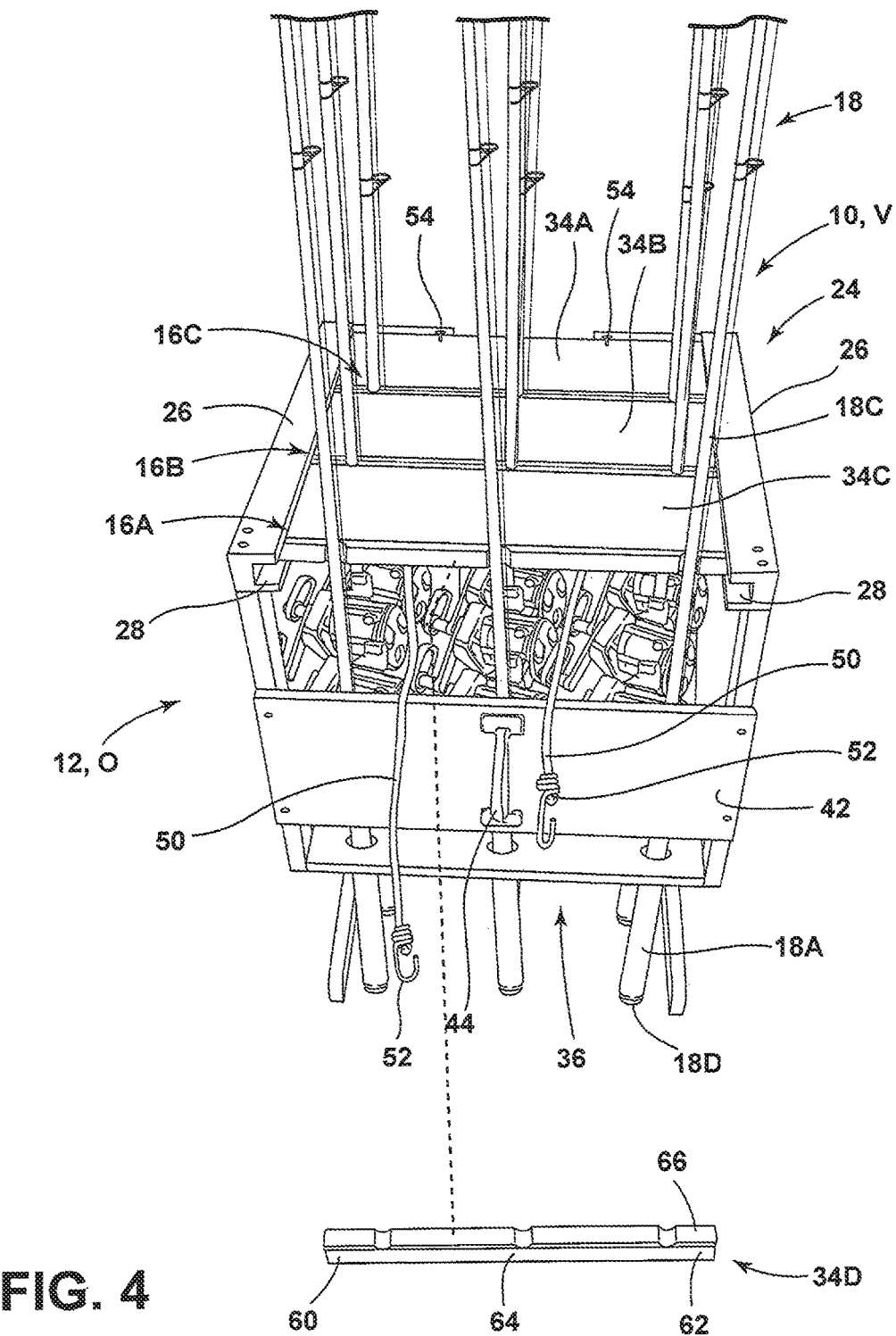
FIG. 4 is a top perspective view of the fishing rod holder of FIG. 1 having a retainer box in an open condition providing access to a first row of fishing rods.

Referring now to FIG. 4, the fishing rod holder 10 is shown in the vertical configuration V and the divider member 34D has been removed from the channels 28 of the first and second brackets 26 of the upper portion 24 of the retainer box 12. In order to remove the divider member 34D from the channels 28 of the first and second bracket members 26A, 26B, the ends 52, 54 of the retaining straps 50 are unhooked from attachment locations 54 disposed on divider member 34A. Hooks 52 of the retaining straps 50 are used to attach to attachment locations 54 when the retainer box 12 is in the closed position C as shown in FIGS. 1-3. As noted above, body portions 53 of the retaining straps 50 wrap around body portions 64 (FIG. 5) of the divider members 34A-34D to retain the fishing rods 18 in the retainer box 12. With divider member 34D removed from the retainer box 12, the first row 16A of fishing rods 18 can be removed from the retainer box 12. Divider member 34D may be considered an end divider member having first and second opposed ends 60, 62 which are configured to be slidingly received in the channels 28 of the brackets 26. The end divider member 34D further includes a body portion 64 having a flexibly resilient cushion layer 66 disposed on an inner edge thereof. The flexibly resilient cushion layer 66 is configured to contact the fishing rods 18 along the shaft portion 18C thereof to provide a cushioning between end divider member 34D and adjacent divider member 34C. In this way, the divider members 34A-34D are configured to apply pressure to the fishing rods 18 at the shaft portions 18C thereof to retain the fishing rods 18 in place without scratching or damaging the shaft portions 18C. Further, the flexibly resilient cushion layer 66 of the end divider member 34D provides a soft cushion for a fishing line should a fishing line get pinched between adjacent divider members 34A-34D. Thus, adjacent divider members 34A-34D are configured to retain a second portion (the shaft portion 18C) of the fishing rods 18, while the handle portions 18A are retained in the planar member 36. With the end divider member 34D removed from the retainer box 12 (as shown in FIG. 4), the first row 16A of fishing rods 18 can be removed from the retainer box, as further shown in FIG. 5. The flexibly resilient cushion layers 66, 66A and 66B disclosed herein may be foam strips adhered to the front and rear edges of the divider members 34A-34D.

Figure 5:
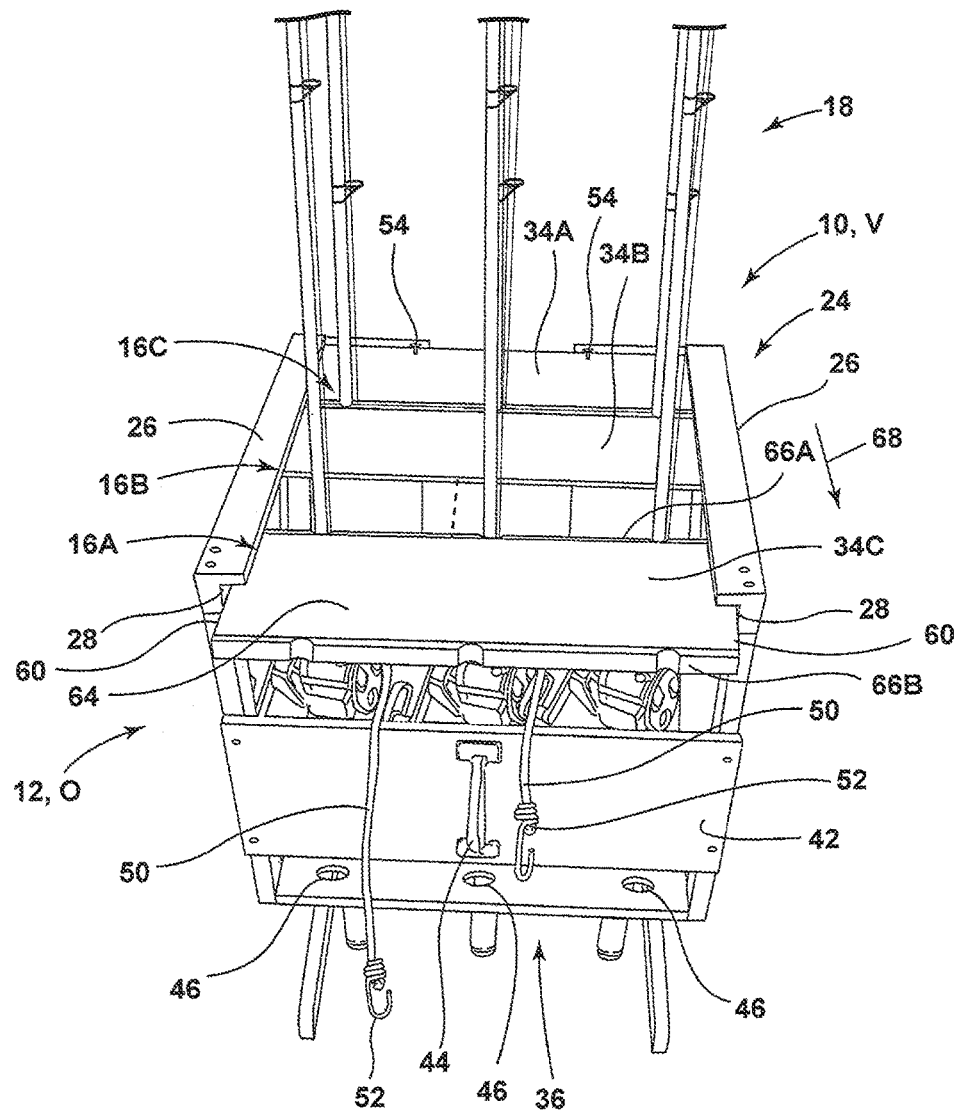
FIG. 5 is a top perspective view of the fishing rod holder of FIG. 4 showing relative motion of a divider member of the retainer box.

Referring now to FIG. 5, divider member 34C is shown being removed from the retainer box 12 in a direction as indicated by arrow 68 by sliding along the channels 28 of the first and second bracket members 26A, 26B. Divider member 34C is allowed to move in the direction as indicated by arrow 68 due to the first row 16A of fishing rods 18 (FIG. 4) having been removed from the retainer box 12. Divider member 34C, much like divider member 34D, includes a body portion 64 having opposite ends 60, 62 which are configured to be received in the channels 28 of the first and second bracket members 26A, 26B of the retainer box 12. First and second flexibly resilient cushion layers 66A, 66B are shown disposed on opposite sides of the body portion 64 of the divider member 34C. In use, cushion layer 66B is used in conjunction with cushion layer 66 of divider member 34D to provide a surrounding cushion material for the fishing rods 18 of the first row 16A of fishing rods, as shown in FIG. 1. Cushion layer 66A works in conjunction with a cushion layer 66B of divider member 34B for providing a cushioning surround for the fishing rods 18 of the second row 16B of fishing rods.

Figure 6:
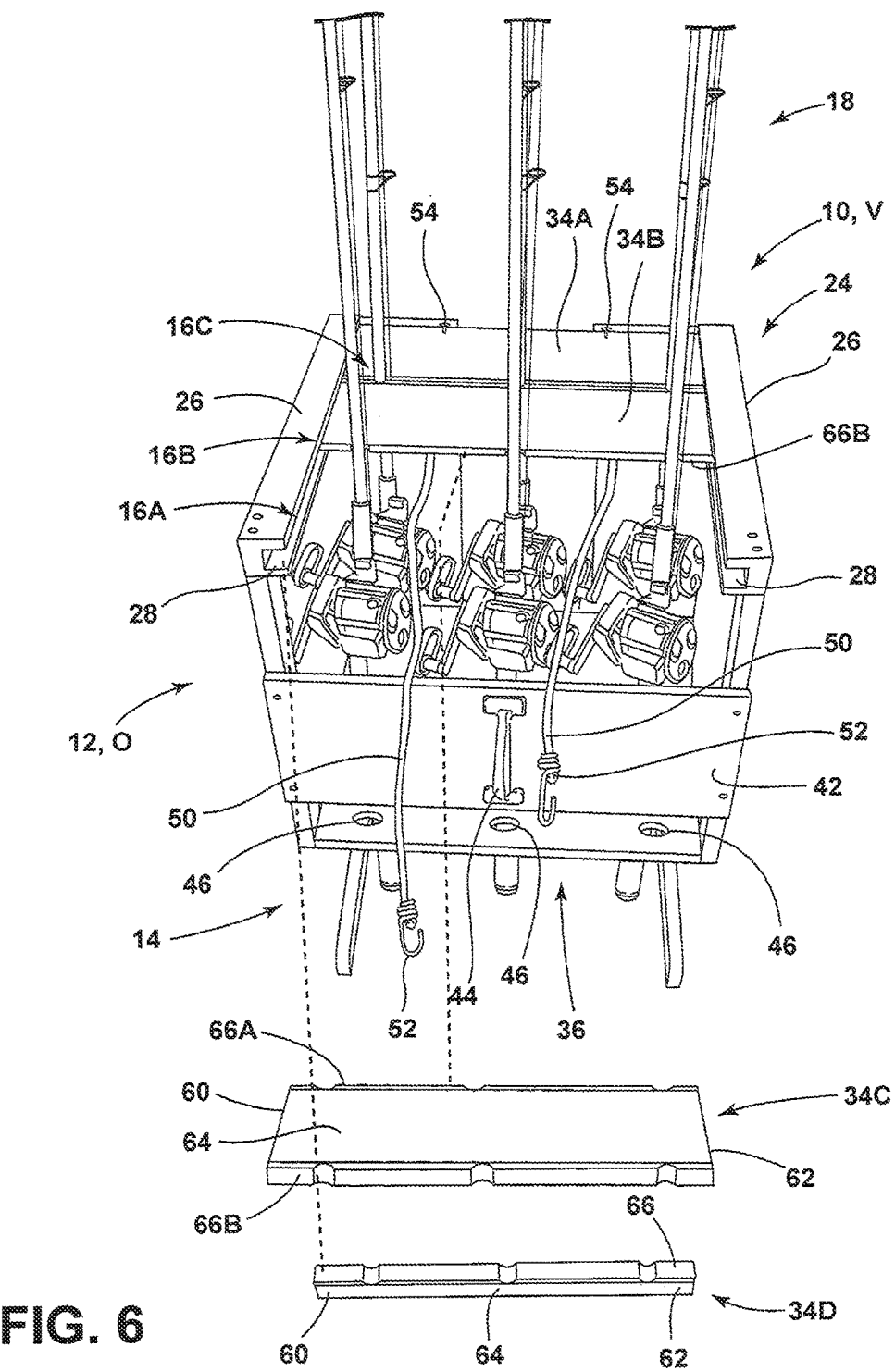
FIG. 6 is a top perspective view of the fishing rod holder of FIG. 5 with a divider member removed from the retainer box to provide access to a second row of fishing rods.

Referring now to FIG. 6, divider member 34C has been removed from the retainer box 12, such that the second row 16B of fishing rods 18 can be removed from the retainer box 12. In FIG. 6, divider member 34C includes body portion 64 having opposite ends 60, 62 which are configured to be received in the channels 28 of the brackets 26 of the retainer box 12. The divider member 34C also includes front and rear edges 65A, 65B of the body portion 64. The first and second flexibly resilient cushion layers 66A, 66B are coupled to the front and rear edges 65A, 65B of the divider member 34C and may include inset portions 67 configured to receive the shaft portions 18C of the fishing rods 18 of the second row 16B of fishing rods. The description of divider member 34C is also accurate for divider member 34B which are both inner divider members flanked by the end divider members 34A, 34D. The inset portions 67 can align between adjacent divider members to provide a cradling effect for the fishing rods 18 within the rows 16A-16C.

Figure 7:
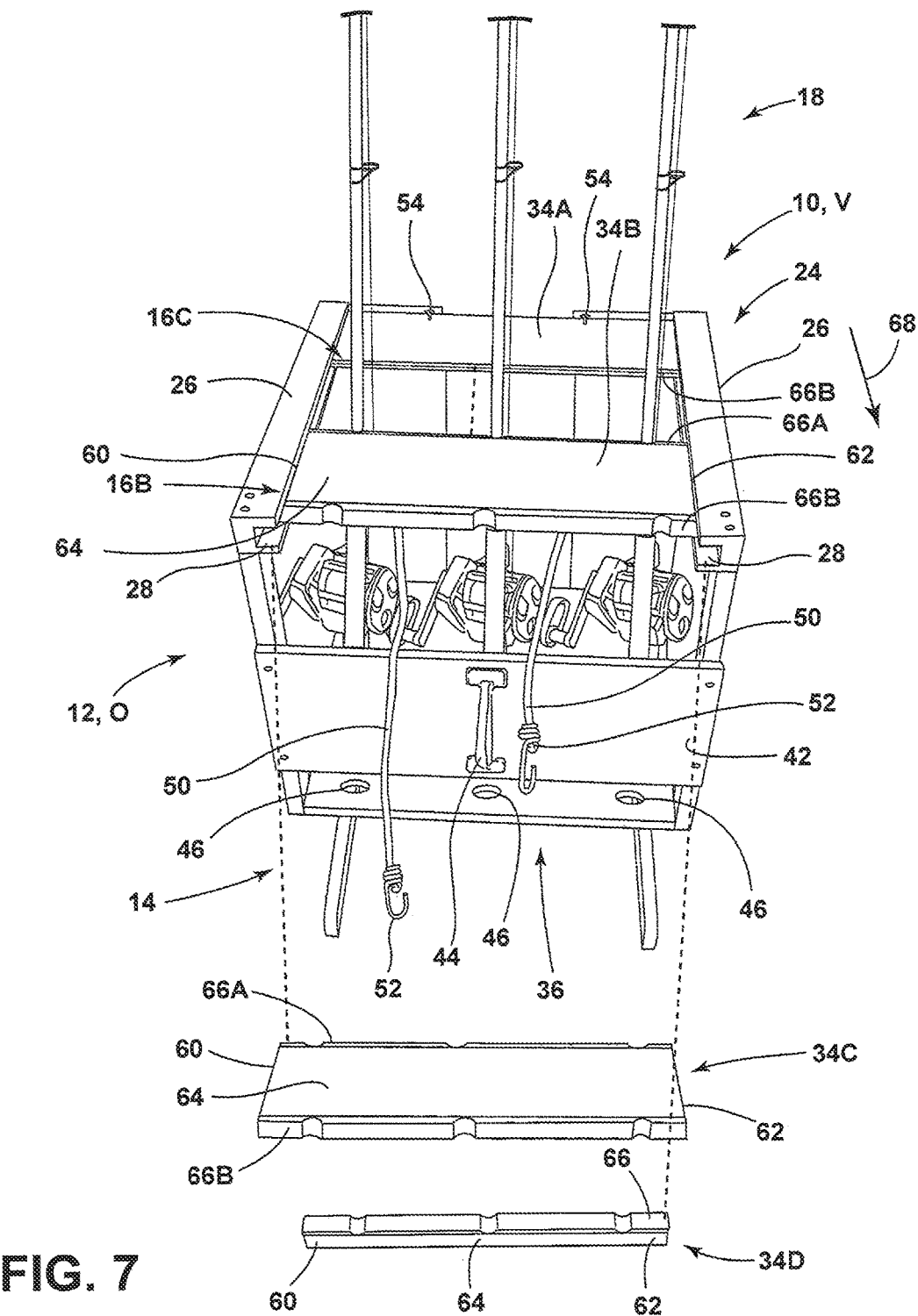
FIG. 7 is a side elevational view of the fishing rod holder of FIG. 6.

Referring now to FIG. 7, the second row 16B of fishing rods 18 (FIG. 6) has been removed from the retainer box 12, such that divider member 34B is now free to move along the channels 28 of the first and second bracket members 26A, 26B in the direction as indicated by arrow 68. With the divider member 34B moved in the path as indicated by arrow 68 in FIG. 7, the first row 16A of fishing rods 18 can be removed from the retainer box 12. Much like divider member 34C, divider member 34B also includes a body portion 64 having opposite ends 60, 62 which are shown disposed within the channels 28 of the first and second bracket members 26A, 26B of the retainer box 12. First and second cushion layers 66A, 66B are shown disposed on opposite sides of the body portion 64, wherein cushion layer 66B of divider member 34B is shown disposed on an inner edge of divider member 34A and is used in conjunction with cushion layer 66A of divider member 34C to retain the second row 16B of fishing rods 18 as shown in FIG. 1. Cushion layer 66A of divider member 34C works in conjunction with cushion layer 66B of divider member 34A to provide a cushioned retaining of the fishing rods 18 in the first row 16A of fishing rods 18. It is contemplated that divider member 34A may be a fixed divider member relative to the retainer box 12, or may also move within the channels 28 of the first and second bracket members 26A, 26B in which opposite ends 60, 62 of divider member 34A are disposed.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A fishing rod holder, comprising:
   a retainer box having front and rear portions, wherein the front and rear portions each include one or more upright frame members, wherein the upright frame members of the rear portion include outwardly extending support portions disposed under the retainer box for abuttingly supporting the retainer box in a raised position on a support surface;
   a planar member disposed on a lower portion of the retainer box, the planar member including a plurality of receiving apertures disposed therethrough, wherein each receiving aperture is configured to receive a portion of a fishing rod therethrough;
   first and second bracket members interconnecting the upright frame members of the front and rear portions of the retainer box, wherein each of the first and second bracket members includes respective first and second channels disposed therealong; and
   a plurality of divider members having body portions with first and second ends and front and rear edges, wherein the first and second ends are slidingly received in the first and second channels of the first and second bracket members for movement along a length thereof, and further wherein adjacent divider members abut one another directly above the receiving apertures of the planar member along respective front and rear edges thereof when received in the first and second channels of the first and second bracket members.

2. The fishing rod holder of claim 1, wherein one or more of the front and rear edges of each divider member includes a flexibly resilient cushion layer disposed thereon.

3. The fishing rod holder of claim 2, wherein the flexibly resilient cushion layer includes one or more inset portions.

4. The fishing rod holder of claim 1, wherein the plurality of divider members includes first and second end divider members having one or more inner divider members disposed therebetween.

5. The fishing rod holder of claim 1, including:
   one or more retaining straps, wherein each of the one or more retaining straps includes first and second ends releasably coupled to the retainer box.

6. The fishing rod holder of claim 5, wherein each of the one or more retaining straps includes a body portion disposed between the first and second ends thereof, and further wherein the body portions are wrapped around the body portions of the divider members of the plurality of divider members to retain the same.

7. A fishing rod holder configured to be supported on a support surface and hold a number of fishing rods, wherein each fishing rod includes a shaft portion having a distal tip and a distal end, a reel assembly, and a handle portion, the fishing rod holder comprising:
   first and second bracket members spaced-apart from one another to define a receiving area therebetween, wherein the first and second bracket members include respective first and second channels inwardly opening into the receiving area;
   first and second frame members coupled to the first and second bracket members respectively, wherein each of the first and second frame members includes a first portion and a second portion extending outwardly from the first portion, wherein fishing rod holder is supported on the support surface at the first portions of the first and second frame members in a first configuration, and further wherein the fishing rod holder is supported on the support surface at the second portions of the first and second frame members in a second configuration; and
   a plurality of divider members having body portions with opposing first and second ends and front and rear edges, wherein the first and second ends of each divider member are slideably and removeably received in the first and second channels of the first and second bracket members, respectively, and further wherein adjacent divider members abut one another along flexibly resilient cushion layers disposed on one of the front and rear edges of the divider members.

8. The fishing rod holder of claim 7, wherein the first and second frame members each included rounded joint portions disposed between the first and second portions thereof.

9. The fishing rod holder of claim 7, wherein both the front and rear edges of each divider member of the plurality of divider members include flexibly resilient cushion layers.

10. The fishing rod holder of claim 7, wherein the number of fishing rods are disposed between adjacent divider members in an upright position when the fishing rod holder is supported on the first portions of the first and second frame members in the first configuration.

11. The fishing rod holder of claim 10, wherein the distal ends of the number of fishing rods are spaced-apart from the support surface in the first configuration.

12. The fishing rod holder of claim 10, wherein the number of fishing rods are disposed between adjacent divider members in a substantially horizontal position when the fishing rod holder is supported on the second portions of the first and second frame members in the second configuration.

13. A fishing rod holder configured to be supported on a support surface and hold a number of fishing rods, the fishing rod holder comprising:
   first and second bracket members spaced-apart from one another to define a receiving area therebetween, wherein the first and second bracket members include respective first and second channels inwardly opening into the receiving area;
   an abutment plate having a plurality of receiving apertures disposed therethrough;
   first and second frame members coupled to the first and second bracket members respectively and the abutment plate, wherein the abutment plate is spaced-apart from the first and second bracket members; and
   a plurality of divider members having body portions with opposing first and second ends and front and rear edges, wherein the first and second ends of each divider member are slideably and removeably received in the first and second channels of the first and second bracket members, and further wherein adjacent divider members define rows for retaining the fishing rods therebetween along abutting flexibly resilient cushion layers disposed on the front and rear edges of each divider member as received in the in the first and second channels of the first and second bracket members.

14. The fishing rod holder of claim 13, wherein the flexibly resilient cushion layers each include one or more inset portions.

15. The fishing rod holder of claim 13, including:
   one or more retaining straps, wherein each of the one or more retaining straps includes a body portion releasably wrapped around the body portions of the plurality of divider members.

16. The fishing rod holder of claim 13, wherein each of the first and second frame members includes an upright portion and a support portion extending outwardly from the upright portion, wherein the fishing rod holder is supported on a support surface at the support portions of the first and second frame members in a first configuration with the fishing rods positioned in a substantially vertical position, and further wherein the fishing rod holder is supported on the support surface at the upright portions of the first and second frame members in a second configuration, wherein the fishing rods are positioned in a substantially horizontal position in the second configuration.

* * * * *